(12) United States Patent
Martz et al.

(10) Patent No.: US 8,080,287 B2
(45) Date of Patent: Dec. 20, 2011

(54) LOW TEMPERATURE CURABLE COATING COMPOSITIONS, RELATED METHODS AND COATED SUBSTRATES

(75) Inventors: Jonathan T. Martz, Glenshaw, PA (US); Kaliappa G. Ragunathan, Gibsonia, PA (US); Deborah E. Hayes, Verona, PA (US); Patrick K. Keane, Allison Park, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 378 days.

(21) Appl. No.: 12/415,082

(22) Filed: Mar. 31, 2009

(65) Prior Publication Data
US 2010/0247785 A1    Sep. 30, 2010

(51) Int. Cl.
*C08L 83/06* (2006.01)
*B05D 3/10* (2006.01)

(52) U.S. Cl. ........................... 427/387; 524/588

(58) Field of Classification Search .................. None
See application file for complete search history.

(56) References Cited

U.S. PATENT DOCUMENTS

| | | | |
|---|---|---|---|
| 3,775,452 A | 11/1973 | Karstedt | |
| 4,381,396 A | 4/1983 | Ryang | |
| 4,511,701 A | 4/1985 | Ryang | |
| 4,542,226 A | 9/1985 | Eddy | |
| 4,595,732 A | 6/1986 | Ryang | |
| 4,598,135 A * | 7/1986 | Buese | 528/23 |
| 4,675,372 A * | 6/1987 | Policastro | 528/26 |
| 4,798,745 A | 1/1989 | Martz | |
| 4,798,746 A | 1/1989 | Claar | |
| 4,814,391 A * | 3/1989 | Colborn | 525/370 |
| 5,015,700 A * | 5/1991 | Herzig et al. | 525/487 |
| 5,059,655 A | 10/1991 | Martz | |
| 5,182,355 A | 1/1993 | Martz | |
| 5,302,684 A | 4/1994 | Stapp | |
| 5,344,890 A * | 9/1994 | Miyazono et al. | 525/326.5 |
| 5,916,992 A | 6/1999 | Wilt | |
| 5,939,491 A | 8/1999 | Wilt | |
| 6,180,696 B1 * | 1/2001 | Wong et al. | 523/457 |
| 6,576,737 B2 * | 6/2003 | Shiono et al. | 528/42 |
| 6,613,449 B2 * | 9/2003 | Yamaguchi et al. | 428/620 |
| 6,733,840 B2 * | 5/2004 | Byrne et al. | 427/387 |
| 6,828,403 B2 * | 12/2004 | Mahdi et al. | 528/18 |
| 2003/0124378 A1 * | 7/2003 | Konarski et al. | 428/620 |
| 2003/0212199 A1 | 11/2003 | Anderson | |
| 2005/0129956 A1 | 6/2005 | Rubinsztajn | |
| 2005/0131106 A1 * | 6/2005 | Tonapi et al. | 523/216 |
| 2006/0272747 A1 * | 12/2006 | Wang et al. | 148/23 |
| 2008/0057207 A1 | 3/2008 | Poppe | |

OTHER PUBLICATIONS

Eddy, Victoria J. et al., "Effects of Proximate Polar Groups on the Rates of Hydrosilylation", 1987, pp. 1903-1906, vol. 52, No. 10, J. Org. Chem., American Chemical Society.
Eddy, Victoria J. et al., "A New One-Component Anhydride-Cured Epoxy with an Aliphatic Disiloxane Dianhydride and Metal-Coordinated Lewis Bases", 1990, pp. 2417-2426, vol. 28, Journal of Polymer Science: Part A: Polymer Chemistry, John Wiley & Sons, Inc.

* cited by examiner

*Primary Examiner* — Robert Loewe
(74) *Attorney, Agent, or Firm* — Donald R. Palladino

(57) ABSTRACT

Disclosed are low temperature curable coating compositions that include a polymer comprising functional groups reactive with anhydride groups and a crosslinking agent that includes the ungelled hydrosilylation reaction product of a silicon hydride and an unsaturated polycarboxylic acid anhydride. Also disclosed are related coated substrates and methods for coating a substrate.

17 Claims, No Drawings

US 8,080,287 B2

LOW TEMPERATURE CURABLE COATING COMPOSITIONS, RELATED METHODS AND COATED SUBSTRATES

FIELD OF THE INVENTION

The present invention relates to coating compositions that are curable at low temperatures, as well as related coated substrates and methods for depositing a coating on a substrate.

BACKGROUND INFORMATION

Ambient and low temperature curable coating compositions are desirable in many applications. For example, such coating compositions are, in at least some cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles, such as automobiles and the like, to be coated may not be convenient for processing through thermal or radiation cure equipment.

Isocyanate-based ambient and low temperature curable coating compositions are common. Isocyanates reacted with amine-functional compounds yield ureas (($NH_2$)$_2$CO) and isocyanates reacted with a hydroxyl functional compound yield urethanes (NHCOO). Polyurethane resins are suited for, and used in, a variety of commercial coatings, such as automotive refinish coatings, including primer sealers, pigmented topcoats and clearcoats. Two component coating compositions that, when combined, react to form a polyurethane are often curable at ambient or low temperatures and are typically catalyzed with tertiary amines or an organotin catalyst, such as dibutyl tin dilaurate. A major concern with polyurethane based coatings, however, is human exposure and proper safety when handling isocyanate-based materials, particularly low molecular weight isocyanates.

As a result, various isocyanate-free ambient and low temperature cure technologies have been explored as alternatives. For example, acrylic polyanhydrides have been used as crosslinkers for hydroxyl functional compounds and amine functional compounds. Unfortunately, these crosslinkers have been of relatively high viscosity as compared to isocyanates. The higher viscosity has necessitated the use of higher amounts of volatile organic compounds (VOCs) to achieve composition viscosities convenient for application by spraying, for example. As will be appreciated, however, use of larger amounts of VOCs is undesirable from, for example, an environmental standpoint. In addition, some of the performance properties of such coatings may be inferior to isocyanate-based compositions.

As a result, it would be desirable to provide substantially isocyanate-free ambient and low temperature cure coating compositions that can sprayable while being low in VOC content and which can provide coatings having good properties, such as good hardness and solvent resistance.

SUMMARY OF THE INVENTION

In certain respects, the present invention is directed to coating compositions comprising: (a) a polymer comprising functional groups reactive with anhydride groups; and (b) a crosslinking agent comprising an ungelled hydrosilylation reaction product of a silicon hydride and an unsaturated polycarboxylic acid anhydride.

In other respects, the coating compositions described above further comprise a hydrolyzable group containing compound.

The present invention is also directed to, inter alia, methods for using such compositions and substrates at least partially coated with a coating deposited from such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to coating compositions, such as liquid coating compositions, including water-borne and organic-solvent borne coating compositions. As used herein, the term "organic-solvent borne" means that the composition utilizes one or more VOCs as the primary dispersing medium. Thus, the dispersing medium either consists exclusively of VOCs or comprises predominantly, i.e., >50%, VOCs in combination with another material, such as, for example, water.

As used herein, the term "VOC" refers to a volatile organic compound, i.e., a compound having at least one carbon atom and which is released from the coating composition during drying and/or curing thereof. Such materials are often included in coating compositions to reduce the viscosity of the composition sufficiently to enable forces available in simple coating techniques, such as spraying, to spread the coating to controllable, desired and uniform thicknesses. Also, such materials may assist in substrate wetting, resinous component compatibility, package stability and coalescence or film formation. Non-limiting examples of suitable VOCs include aromatic hydrocarbons, such as toluene and xylene;

ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; monoether glycol acetates, such as 2-ethoxyethyl acetate; as well as compatible mixtures thereof.

In certain embodiments, the solvent-borne coating compositions of the present invention are sprayable yet low in VOC content. As used herein, the term "sprayable" refers to compositions that are capable of being applied uniformly by atomization through a device such as a spray gun. Sprayability, as will be appreciated by those skilled in the art, is a function of the viscosity of a material. In certain embodiments, the compositions of the present invention have a viscosity of from 2 to 300 centipoise or, in other embodiments, from 20 to 150 centipoise, or, in yet other embodiments, 20 to 120 centipoise, at 25° C. (77° F.) measured as described in the Examples herein. As used herein, "low in VOC content" means that the composition no more than 4 pounds of VOC per 1 gallon of the composition. In some embodiments, the coating compositions of the present invention comprise no more than 3.5, in some cases, no more than 3 pounds, VOC per 1 gallon of the composition.

In certain embodiments, the coating compositions of the present invention are "low temperature curable", which refers to coating compositions that, following application to a substrate, are capable of curing in the presence of air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

In certain embodiments, the coating compositions are substantially, or, in some cases, completely free of isocyanate functional compounds. As used herein, the term "substantially free" means, when used with reference to the substantial absence of a material in a coating composition, that such a material is present, if at all, as an incidental impurity. In other words, the material does not affect the properties of the coating composition. As to the substantial absence of isocyanate functional compounds in the coating compositions of the present invention, "substantially free", in certain embodiments, means that isocyanate functional compounds are present in the coating compositions of the present invention in an amount less than 1 percent by weight, such as no more than 0.5 percent by weight, or, in some cases, no more than 0.1 percent by weight, based on the total resin solids weight of the coating composition. As used herein, the term "completely free" means that a material is not present in the composition at all. As used herein, the term "isocyanate functional compounds" refers to compounds comprising at least one, in some cases, two or more, isocyanate (NCO) functional groups per molecule.

The coating compositions of the present invention comprise a polymer comprising functional groups reactive with anhydride groups. As used herein, the term "polymer" refers broadly to prepolymers, oligomers and both homopolymers and copolymers. The prefix "poly" as used herein refers to two or more. The polymers can be, for example, acrylic polymers, polyvinyl polymers, phenolics, polyester polymers, polyurethane polymers, polyamide polymers, polyether polymers, polysiloxane polymers, copolymers thereof, and mixtures thereof. Examples of functional groups reactive with anhydride groups are hydroxyl, amine, and thiol groups. As a result, in certain embodiments, the foregoing polymers comprise at least one, in some cases at least two, or, in yet other cases, three or more hydroxyl and/or amine groups per molecule.

In certain embodiments, the polymer comprising functional groups reactive with anhydride groups comprises a polyol, such as, for example, an acrylic polyol, a polyester polyol, a polyether polyol, an amide-containing polyol, an epoxy polyol, a polyhydric polyvinyl alcohol, cellulose and derivatives thereof, a urethane polyol, and mixtures thereof. Suitable such polyols are described in more detail in U.S. Pat. No. 4,798,745 at col. 4, line 3 to col. 7, line 26, the cited portion of which being incorporated herein by reference. When an acrylic polyol is used, its peak molecular weight, as determined by gel permeation chromatography utilizing a polystyrene standard, is, in certain embodiments, in the range of 1,000 to 50,000.

The coating compositions of the present invention further comprise a crosslinking agent comprising the ungelled hydrosilylation reaction product of a silicon hydride and an unsaturated polycarboxylic acid anhydride. As used herein, the term "ungelled" means a reaction product that is substantially free of crosslinking and has an intrinsic viscosity when dissolved in a suitable solvent, as determined, for example in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000. As used herein, the term "hydrosilylation reaction" refers to the reaction between molecules containing aliphatic unsaturation, i.e., C=C, and molecules containing silicon hydride, i.e., Si—H.

In certain embodiments of the present invention, the silicon hydride comprises a polysiloxane containing silicon hydride. As used herein, the term "polysiloxane" refers to compounds based on a structure comprising alternate silicon and oxygen atoms. In certain embodiments, the polysiloxane containing silicon hydride has one of the following general formulas:

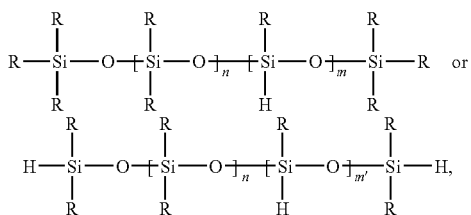

wherein each substituent group R, which may be identical or different, represents OH or a monovalent hydrocarbon group connected to the silicon atom; n is 0 to 50, such as 2 to 15, m is at least 1; and m' is 0 to 50, such that the ratio of hydrogen-bonded silicon atoms to non-hydrogen-bonded silicon atoms is from 0.1:1 to 10:1.

In certain embodiments, the polysiloxane containing silicon hydride has the general structure:

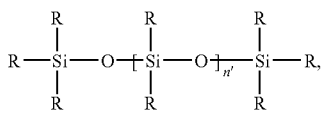

wherein each substituent group R, which may be identical or different, represents a group selected from H, OH, a monovalent hydrocarbon group, and mixtures of any of the foregoing; at least one of the groups represented by R is H, and n' ranges from 0 to 100, such as 0 to 10, or, in some cases, 0 to 5, such that the percent of Si—H content of the polysiloxane ranges from 2 to 50 percent, such as 5 to 25 percent. Examples of a polysiloxane containing silicon hydride are 1,1,3,3-tetramethyl disiloxane and polysiloxane containing silicon hydrides where n is 4 to 5, commercially available from BASF as MASILWAX BASE.

As indicated, the crosslinking agents present in the coating compositions of the present invention comprise, or, in some cases, consists essentially of, the reaction product of a silicon hydride, such as described above, and an unsaturated polycarboxylic acid anhydride, such as a Diels Alder reaction product of a diene and an unsaturated polycarboxylic, such as dicarboxylic, acid anhydride. In certain embodiments, the unsaturated polycarboxylic acid anhydride comprises a cycloaliphatic unsaturated dicarboxylic acid anhydride, such as a compound of the general formula:

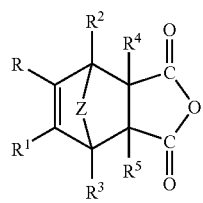

wherein Z is selected from —O— and C—(R)$_2$ and R, R$^1$, R$^2$, R$^3$, R$^4$, and R$^5$ are each independently selected from hydrogen, a halogen, a C$_{(1-13)}$ monovalent hydrocarbon radical, and a substituted C$_{(1-13)}$ monovalent hydrocarbon radical.

Radicals included within R, R$^1$, R$^2$, R$^3$, R$^4$, and R$^5$ are, for example, halogen, such as fluoro, chloro, bromo, etc.; aryl radicals and halogenated aryl radicals, for example, phenyl, chlorophenyl, tolyl, xylyl, biphenyl, naphthyl, etc.; alkenyl radicals, for example, vinyl, allyl, cyclohexenyl, etc.; C$_{(1-8)}$ alkyl radicals, halogenated alkyl and aminoalkyl radicals, for example, methyl, ethyl, propyl, butyl, octyl, etc. In instances where R—R$^5$ is more than one radical, these radicals can be all the same or any two or more the aforementioned radicals.

In certain embodiments, the crosslinking agent comprising the ungelled hydrosilylation reaction product of a silicon hydride and an unsaturated polycarboxylic acid anhydride utilized in the coating compositions of the present invention has a peak molecular weight, as determined by gel permeation chromatography utilizing a polystyrene standard, is in the range of 460 to 2500 such as 900 to 1600. A suitable method for making such a crosslinking agent is described in the Examples herein.

In certain embodiments, the coating compositions of the present invention comprise an additional crosslinking agent comprising at least two carboxylic acid anhydride groups per molecule, such as any monomeric or polymeric carboxylic acid anhydride, examples of which include, but are not limited to, the carboxylic acid anhydrides identified in U.S. Pat. No. 4,798,746 at col. 7, lines 4-41, the cited portion of which being incorporated herein by reference, the acrylic polyanhydrides described in U.S. Pat. No. 4,798,745 at col. 7, line 27 to col. 8, line 3, the cited portion of which being incorporated herein by reference, and the polyurethane polyanhydrides described in U.S. Pat. No. 5,059,655 at col. 2, line 64 to col. 5, line 57 and U.S. Pat. No. 5,182,355 at col. 2, line 64 to col. 5, line 59, the cited portions of which being incorporated herein by reference.

In other embodiments, however, the coating compositions of the present invention are substantially or, in some cases, completely free of one or all of the monomeric or polymeric carboxylic acid anhydrides described in the preceding paragraph. In certain embodiments, this means that such carboxylic acid anhydrides are present in the coating compositions of the present invention in an amount such that there are less than 0.1 equivalents, such as no more than 0.05 equivalents or, in some cases, no more than 0.01 equivalents of anhydride groups from such a carboxylic acid anhydride in the coating composition for every 1 equivalent of co-reactive functional groups present in the composition from the polymer comprising functional groups reactive with anhydride groups that was described above. As such, in certain embodiments of the present invention, the crosslinking agent consists essentially of the reaction product of a silicon hydride and an unsaturated polycarboxylic acid anhydride, such as described above. In this context, "consists essentially of" means that at least 90% or, in some cases, at least 95% or at least 99% of the anhydride groups present in the coating composition of the present invention are present on such a reaction product.

Generally the amounts of (i) polymer(s) comprising functional groups reactive with anhydride groups, and (ii) crosslinking agent(s) comprising carboxylic acid anhydride groups are selected to provide a ratio of equivalents of functional groups reactive with anhydride groups to equivalents of anhydride groups in a range of 3:1 to 1:3, such as 1:1.

In certain embodiments, the coating compositions of the present invention comprise a cure promoting catalyst for promoting the curing reaction between the polymer (a) and the crosslinking agent (b). Exemplary such catalysts include base catalysts, such as triphenylphosphine, ethyltriphenyl phosphonium iodide, tetrabutyl phosphonium iodide and tertiary amines, such as benzyldimethylamine, dimethyllaurylamine, dimethylaminocyclohexane, triethylamine, and the like, N-methylimidazole, and tetrabutyl ammonium hydroxide. Also suitable are 1,4-diazabicyclo[2.2.2]octane (DABCO), amidine derivatives, such as 1,8-diazobicyclo[5.4.0]undec-7-ene ("DBN"); 1,5-diazobicyclo[4.3.0]non-5-ene ("DBU"); and tetramethylguanidine ("TMG"), which are described in U.S. 2004/0242867, as well as the cyclic guanidines described in United States Patent Application Publication No. 2009-0042060A1.

In other embodiments, however, such catalysts are not necessary. Indeed, it has been discovered that, in at least some cases, cure can be achieved in the absence of any such materials typically used to catalyze the reaction between a polymer comprising anhydride reactive groups and a crosslinking agent comprising agent comprising carboxylic acid anhydride groups, such as the catalysts described in U.S. Pat. No. 4,798,745 at col. 8, lines 4 to 35, the cited portion of which being incorporated herein by reference. As a result, in certain embodiments, the coating compositions of the present invention are substantially, or, in some cases, completely free of such catalysts.

It has been discovered, surprisingly, that the coating compositions of the present invention that comprise (a) a polymer comprising functional groups reactive with anhydride groups; and (b) a crosslinking agent comprising the ungelled hydrosilylation reaction product of a silicon hydride and an unsaturated polycarboxylic acid anhydride, can produce compositions that, in at least some cases, are sprayable yet low in VOC content, while still providing coatings having good properties, such as good hardness and solvent resistance.

In certain embodiments, the coating compositions of the present invention comprise an additional film-forming material that is cured via another mechanism from that described above and, as a result, such coating compositions can be "dual cure" compositions that cure via two or more different cure mechanisms. For example, in certain embodiments, the coating compositions of the present invention comprise a hydrolyzable group containing compound. As used herein, the term "hydrolyzable group" refers to a group or moiety which is capable of undergoing hydrolysis or solvolysis. For example, a hydrolyzable group can be hydrolyzed (i.e., converted to a hydrogen group) by exposure to water or a protic solvent at or near ambient temperature or an elevated temperature and at or near atmospheric pressure or an elevated pressure. In some cases, a hydrolyzable group can be hydrolyzed by exposure to acidic or alkaline water or acidic or alkaline protic solvent.

In certain embodiments, the hydrolyzable group containing compound utilized in certain coating compositions of the present invention comprise an alkoxysilane functional group containing monomer and/or polymer. Suitable monomeric alkoxysilanes include, for example, silanes comprising two, three, four, or more alkoxy groups per molecule. Specific examples of suitable monomeric alkoxysilanes include, without limitation, methyltrimethoxysilane, methyltriethoxysilane, methyltrimethoxysilane, methyltriacetoxysilane, methyltripropoxysilane, methyltributoxysilane, ethyltrimethoxysilane, ethyltriethoxysilane, γ-meth-acryloxypropyltrimethoxysilane, γ-aminopropyltrimethoxysilane, γ-aminopropyltriethoxysilane, γ-mercaptopropyltrimethoxysilane, chloromethyltrimethoxysilane, chloromethytriethoxysilane, dimethyldiethoxysilane, γ-chloropropylmethyldimethoxysilane, γ-chloropropylmethyldiethoxysilane, tetramethoxysilane, tetraethoxysilane, tetra-n-propoxysilane, tetra-n-butoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxy-propyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropylmethyldimethoxysilane, γ-glycidoxypropyldimethylethoxysilane, and mixtures of such silane monomers.

In certain embodiments, the hydrolyzable group containing compound comprises an alkoxysilane functional group containing polymer, such as, without limitation, an alkoxysilane functional group containing acrylic polymer, polyester, polyether polyol, epoxy, polyurethane, polysiloxane, and mixtures thereof. As will be appreciated, alkoxysilane functional group containing acrylic polymers, for example, can be prepared by copolymerizing various ethylenically unsaturated alkoxy functional monomers with other ethylenically unsaturated monomers via solution polymerization techniques in the presence of suitable initiators. Examples of suitable alkoxysilane functional acrylic polymers, as well as their preparation, are disclosed in U.S. Pat. Nos. 4,043,953 and 4,614,777, the relevant portions of which being incorporated herein by reference.

In certain embodiments, however, the hydrolyzable group containing compound utilized in the coating compositions of the present invention comprises a urea silane, which, as used herein, refers to a compound comprising both at least one urea group and at least one hydrolyzable silane group. As will be appreciated, such urea silanes can be, and often are, the reaction product of, for example, an isocyanate, such as a polyisocyanate, i.e., a compound comprising two or more isocyanate groups per molecule, with an aminoalkoxysilane.

Suitable isocyanates for use in the foregoing reaction, include, without limitation, aliphatic, including cycloaliphatic, heterocyclic, and/or aromatic polyisocyanates. Such polyisocyanates can contain, for example, from 2 to 4, such as 3 isocyanate groups per molecule. Examples of suitable aromatic diisocyanates are 4,4'-diphenylmethane diisocyanate, 1,3-phenylene diisocyanate, 1,4-phenylene diisocyanate and tolylene diisocyanate. Examples of suitable aliphatic diisocyanates are straight chain aliphatic diisocyanates such as 1,4-tetramethylene diisocyanate and 1,6-hexamethylene diisocyanate. Examples of suitable cycloaliphatic diisocyanates are 1,4-cyclohexyl diisocyanate, isophorone diisocyanate, alpha, alpha-xylylene diisocyanate, dicyclohexylmethyldiisocyanate ("TMXDI"), and 4,4-methylene-bis(cyclohexyl isocyanate). Substituted organic polyisocyanates can also be used in which the substituents are nitro, chloro, alkoxy and other groups that are not reactive with hydroxyl groups or active hydrogens and provided the substituents are not positioned to render the isocyanate group unreactive.

Examples of suitable isocyanates also include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR Z 4470, a trimer of isophorone diisocyanate, available from Bayer Corporation the uretdione of 1,6-hexamethylene diisocyanate, the biuret and isocyanurate of 1,6-hexanediisocyanate and the isocyanurate of isophorone diisocyanate. Commercially available isocyanates, which are suitable for use in the present invention include, but are not limited to, those available under the name DESMODUR from Bayer Corporation of Pittsburgh, Pa. and include, for example, DESMODUR N 3200, DESMODUR N 3300, DESMODUR N 3400, DESMODUR XP 2410, and DESMODUR XP 2580.

Thioisocyanates can be employed as well as mixed compounds containing both an isocyanate and a thioisocyanate group. The terms "polyisocyanate" and "diisocyanate", as used herein, are intended to cover compounds and adducts containing thioisocyanate groups or isocyanate groups and compounds and adducts containing both isocyanate and thioisocyanate groups.

Suitable aminoalkoxysilanes including, for example, compounds having the formula:

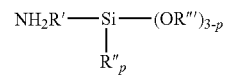

wherein R' is an alkylene group having from 2 to 10 carbon atoms, R" is an alkyl, aryl, alkoxy, or aryloxy group having from 1 to 8 carbon atoms, R''' is an alkyl group having from 1 to 8 carbon atoms, and p has a value of from 0 to 2.

Specific examples of aminofunctional silanes which are suitable for use in preparing a urea silane suitable for use in the present invention include aminoethyltriethoxysilane, γ-aminopropyltriethoxysilane, γ-aminopropylmethyldiethoxysilane, γ-aminopropylethyldiethoxysilane, γ-aminopropylphenyldiethoxysilane, γ-aminopropyltrimethoxysilane, δ-aminobutyltriethoxysilane, δ-aminobutylethyldiethoxysilane.

In certain embodiments, however, the aminoalkoxysilane comprises a secondary amine-containing alkoxysilane, such as those represented by the general formula:

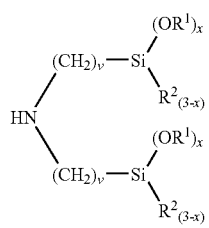

wherein each $R^1$ and $R^2$, which may be identical or different, represent an alkyl group containing from 1 to 10, such as 1 to 3, carbons or a phenyl group; each v, which may be the same or different, is an integer of from 1 to 10; and x is an integer equal to 1, 2 or 3. In certain embodiments, x is 3, v is 3, and $R^1$ is methyl.

A suitable method for making a urea silane suitable for use in the present invention is described in the Examples herein. In certain embodiments, the foregoing reaction conducted such that the equivalent ratio of amine groups to isocyanate groups is at least 1:1, in some cases, at least 1.05:1, such that the reaction product is substantially, or, in some cases, completely free of isocyanate groups.

It has been discovered, surprisingly, that "dual cure" coating compositions of the present invention that comprise a urea silane of the type previously described in combination with a polymer comprising functional groups reactive with anhydride groups and a crosslinking agent comprising the ungelled hydrosilylation reaction product of a silicon hydride and an unsaturated polycarboxylic acid anhydride, can produce compositions that, in at least some cases, are sprayable yet low in VOC content, while providing coatings having very good properties, such as excellent hardness and chemical resistance.

In certain embodiments, the hydrolyzable group containing compound is present in the coating compositions of the present invention in an amount of up to 50 percent by weight, such as 1 to 50, 10 to 40, or, in some cases, 20 to 40 percent by weight, based on the total resin solids weight of the composition.

In certain embodiments, the combination of the polymer comprising functional groups reactive with anhydride groups and a crosslinking agent(s) therefor are present in the coating compositions of the present invention in an amount of at least 50 percent by weight, such as at least 60, or, in some cases, at least 70 percent by weight, based on the total resin solids weight of the composition.

In certain embodiments, the coating compositions of the present invention are substantially or, in some cases, completely free of radiation curable compounds. As used herein, the term "radiation curable," when used with reference to a compound, refers to compounds that comprise reactive groups that are capable of being polymerized and/or crosslinked by exposure to actinic radiation, such as an electron beam (EB), UV light, or visible light, examples of which include the compounds described in U.S. Pat. No. 7,411,033.

The coating compositions of the present invention can further include additives as are commonly known in the art, such as surfactants, wetting agents, and colorants, among others. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, and fillers such as calcium carbonate, barium sulfate and the like.

As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

The curable coating compositions of the invention can be prepared by any method well known to those having ordinary skill in the art using the above components as raw materials. A suitable method is illustrated in the Examples herein.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157, 924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe mid soles. Different types of EVA foam can have different types of surface porosity. Molded EVA can comprise a dense surface or "skin", whereas flat sheets or slabs can exhibit a porous surface.

The coating compositions of the present invention can be applied to such substrates by any of a variety of methods including dipping or immersion, spraying, intermittent spraying, dipping followed by spraying, spraying followed by dipping, brushing, or roll-coating, among other methods. In certain embodiments, however, the coating compositions of the present invention are applied by spraying and, accordingly, such, compositions, as discussed above, often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition of the present invention to the surface of a substrate or article to be coated, coalescing the coating composition to form a substantially continuous film and then curing the thus-obtained coating. The curing of these coatings can take place at ambient or elevated temperatures. The method of using a coating composition of the present invention comprises allowing the composition to cure at low temperature, such as ambient temperature of 20° C. to a maximum of 60° C.

The present invention is also directed to methods for coating a substrate. These methods comprise: (A) combining the contents of a first package and a second package, wherein (1) the first package comprises a polymer comprising functional groups reactive with anhydride groups; and (2) the second package comprises a crosslinking agent comprising the ungelled hydrosilylation reaction product of a silicon hydride and an unsaturated polycarboxylic acid anhydride, and (3) the contents of the first package and the second package are combined such that molar ratio of anhydride reactive groups in the first package to carboxylic anhydride groups in the second package is from 1:3 to 3:1; (B) applying the combination to at least a portion of the substrate; (C) allowing the combination to coalesce form a substantially continuous film; and (D) curing the combination at a temperature of no more than 60° C.

Illustrating the invention are the following examples that are not to be considered as limiting the invention to their details.

Example 1

A reaction vessel equipped stirrer, thermocouple, condenser and addition funnels equipped with pumps was charged with 500.0 grams (g) of n-butyl acetate and 6.0 g triphenyl phosphite and heated to reflux, about 123° C. Two feeds, identified herein as A and B, were next gradually added to the vessel over a period of two and two and a half hours, respectively, while the contents of the vessel were maintained at reflux conditions. Feed A was a mixture of 300.0 g styrene, 384.0 g 4-hydroxybutyl acrylate (available from BASF), 276.0 g methyl methacrylate and 240.0 g n-butyl methacrylate. Feed B was a mixture of 72.0 g Luperox 575 (from Arkema) and 180.0 g n-butyl acetate. After the addition of the two feeds A and B was complete the addition funnels were rinsed with 35.5 g and 16.4 g of n-butyl acetate, respectively, and the contents of the vessel were allowed to reflux for 1 hour. Thereafter, heating was discontinued and the contents of the vessel were allowed to cool.

The resultant product contained a film-forming polymer that had a total solids content measured for 1 hour at 110° C. of 62.2 percent by weight; had a peak molecular weight of 11,406, a weight average molecular weight of 13,366 and a number average molecular weight of 4,076 as determined by gel permeation chromatography utilizing a polystyrene standard; had a Gardner-Holt viscosity of Y+; had a weight/gallon of 8.50; had a hydroxyl value of 78.9.

Example 2

A one liter stirred stainless steel pressure reactor was charged with 220.0 g butyl acetate and heated to 220° C. The agitation on the reactor was set at 500 rpms. Two feeds, identified herein as A and B, were next gradually added to the vessel over a period of 20 minutes while the contents of the vessel were maintained at 220° C. and 100 psi. Feed A was a mixture of 150.0 g styrene, 192.0 g 4-hydroxybutyl acrylate (available from BASF) and 258.0 g methyl methacrylate. Feed B was a mixture of 18.0 g Luperox DTA (from Arkema). Thereafter, heating was discontinued and the contents of the vessel were allowed to cool.

The resultant product contained a film-forming polymer that had a total solids content measured for 1 hour at 110° C. of 67.4 percent by weight; had a peak molecular weight of 2197, a weight average molecular weight of 2423 and a number average molecular weight of 1323 as determined by gel permeation chromatography utilizing a polystyrene standard; had a Gardner-Holt viscosity of L; had a weight/gallon of 8.77; had a hydroxyl value of 90.3.

Example 3

A reaction vessel equipped stirrer, thermocouple, condenser and addition funnel was charged with 150.0 g of norbornene dicarboxylic acid anhydride (available from TCI America), 2.50 g Karsted's catalyst (platinum(0)-1,3-divinyl-1,1,3,3-tretramethyldisiloxane complex solution in xylene; available from Sigma-Aldrich) and 278.8 g n-butyl acetate and heated to 80° C. 128.8 g of Masilwax Base 135 silicone prepolymer (from BASF Surfactants) was next gradually added to the vessel over a period of 90 minutes. The reaction contents were stirred along with additional 2.50 g Karsted's catalyst and the reaction monitored for disappearance of Si—H (3.65 ppm) and olefinic protons (6.29 ppm) by proton NMR. The reaction was discontinued after of olefin and hydrosilane were 88% and 89% complete, respectively. n-Butyl acetate was removed by vacuum distillation. Then, the condensed product was diluted with 30.0 g of n-butyl acetate.

The resultant product contained a film-forming polymer that had a theoretical solids of 90 percent by weight; had a weight/gallon of 9.56; had a anhydride equivalent weight of 305 (on solids); had a peak molecular weight of 1291, a weight average molecular weight of 1504 and a number average molecular weight of 1051 as determined by gel permeation chromatography utilizing a polystyrene standard.

Example 4

A reaction vessel equipped stirrer, thermocouple, condenser and addition funnel was charged with 305.8 grams of Desmodur XP 2410 (available from Bayer MaterialScience), 1.25 g triphenyl phosphite (available from Chemtura) and 160.9 g n-butyl acetate and stirred at ambient temperature (about 23° C.). Then 600.8 g Silquest A-1170 aminosilane (available from Momentive Performance Materials) was gradually added to the vessel over a period of 4 hours while maintaining the temperature at less than 50° C. Then, the reaction contents were stirred at 50° C. until there was no isocyanate by infrared spectroscopy. Thereafter, heating was discontinued and the contents of the vessel are allowed to cool.

The resultant product contained a film-forming polymer that had a total solids content of 83.4 percent by weight; had a weight/gallon of 9.56; had a Brookfield viscosity of 1722 centipoise (#3 spindle at 60 rpm).

Example 5

Pre-mixture A was prepared by mixing the components of Table 1 sequentially with mild agitation. Acrylic polyol packages were prepared by mixing the components of Table 2.

TABLE 1

| Ingredient | Parts by weight (grams) |
| --- | --- |
| Butyl Acetate | 147.0 |
| Methyl Amyl Ketone | 79 |
| Xylene | 4.4 |
| Byk 300[1] | 1.3 |
| Modaflow 2100[2] | 3.3 |
| Eversorb 74[3] | 12.8 |

[1]Byk 300 silicone resin solution commercially available from Byk Chemie.
[2]Modaflow 2100 acrylic resin solution commercially available from Cytec Industries, Inc.
[3]UV absorber commercially available from Everlight Chemical.

TABLE 2

| Ingredient | Example A Parts by weight (grams) | Example B Parts by weight (grams) |
| --- | --- | --- |
| Pre-mixture A | 43.9 | 44.0 |
| N,N-Dimethyldodecane[4] | 1.9 | 1.9 |
| Resin from Example 1 | 48.4 | |
| Resin Example 2 | | 44.7 |

[4]N,N-Dimethyldodecane commercially available from Albemarle Corporation.

Coating compositions were prepared by mixing the components of Table 3 sequentially with mild agitation.

TABLE 3

| Ingredient | Example C Parts by weight (grams) | Example D Parts by weight (grams) |
| --- | --- | --- |
| Acrylic polyol package from Example A | 84.6 | |
| Acrylic polyol package from Example B | | 82.1 |
| Resin Example 3 | 20.6 | 20.3 |
| Resin Example 4 | | 43.9 |

The coating compositions of Examples C and D were spray applied along with DC4000 and NCT DC1100E/D1275E (both available from PPG Industries) to a pigmented basecoat to form color-plus-clear composite coatings over E-Coat 6060 primed cold rolled steel panels available from ACT Test Panels, Inc. of Hillsdale, Mich. The Examples used Deltron W3964 a solventborne basecoat, available from PPG Industries.

Basecoats were spray applied to panels at ambient temperature (about 70° F. (21° C.)). A dry film thickness of about 0.5-0.7 mils (about 13-20 micrometers) was targeted for the basecoats. The basecoat panels were air dried prior to clearcoat application.

The clear coating compositions were spray applied to a basecoated panel at ambient temperature in two coats with an ambient flash between applications. Clearcoats were targeted for a 2 mils (about 50 micrometers) dry film thickness. All coatings were allowed to air flash at ambient temperature before the oven. Panels were also baked for thirty minutes at 140° F. (60° C.). Results are set forth in Table 4.

TABLE 4

| Coating | Cure | Spray VOC | Spray Viscosity[4] (cps) | Konig[1] (1 day/ 1 week) | Adhesion[2] | Xylene[3] |
| --- | --- | --- | --- | --- | --- | --- |
| DC4000 (Control) | Ambient | 5.00 | 18 | 31/49 | 10 | 0 |
| DC4000 (Control) | 30' @ 60° C. | | | 40/60 | 10 | 0 |
| NCT DC1100E/ D1275E | Ambient | 5.50 | 24 | 20/29 | 9 | 3 |
| NCT DC1100E/ D1275E | 30' @ 60° C. | | | 18/28 | 9 | 3 |
| Example C | Ambient | 4.26 | 28 | 28/40 | 10 | 2 |
| Example C | 30' @ 60° C. | | | 35/38 | 10 | 2 |
| Example D | Ambient | 3.60 | 42 | 38/40 | 10 | 1 |

TABLE 4-continued

| Coating | Cure | Spray VOC | Spray Viscosity[4] (cps) | Konig[1] (1 day/ 1 week) | Adhesion[2] | Xylene[3] |
|---|---|---|---|---|---|---|
| Example D | 30' @ 60° C. | | | 50/58 | 10 | 1 |

[1]"Konig" refers to Konig Hardness as conventionally measured at 24 hours and 7 days, respectively, after application of the topcoating composition to the panel.
[2]"Adhesion" refers to the cross-hatch adhesion of the composite film to the substrate after 7 days and is determined by ASTM test method D3359. The values for this test range from 0 to 10. A value of 10 for this test means that there is no adhesion failure (or no "pickoff") of the composite coating in any manner.
[3]"Xylene" refers to the solvent resistance of the coating when 2 drops of xylene are applied to the coating and allowed to evaporate. A rating of 0 means that there was no visible effect (deterioration) on the coating in this test; a rating of 2 means the xylene slightly softened and etched the coating; a rating of 3 means substantial softening of the coating accompanied by slight or moderate wrinkling.
[4]"Spray viscosity" refers to the viscosity at 25° C. using a LVT Brookfield viscometer with a #2 spindle at 60 rpms.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising:
   (a) a polymer comprising functional groups reactive with anhydride groups; and
   (b) a crosslinking agent comprising an ungelled hydrosilylation reaction product of a silicon hydride and an unsaturated polycarboxylic acid anhydride; and
   (c) a urea silane that is the reaction product of a polyisocyanate and a secondary amine-containing alkoxysilane represented by the general formula:

$$HN \begin{matrix} (CH_2)_v - Si \begin{matrix} (OR^1)_x \\ R^2_{(3-x)} \end{matrix} \\ (CH_2)_v - Si \begin{matrix} (OR^1)_x \\ R^2_{(3-x)} \end{matrix} \end{matrix}$$

wherein each $R^1$ and $R^2$, which may be identical or different, represents an alkyl group containing from 1 to 10 carbons or a phenyl group; each v, which may be the same or different, is an integer of from 1 to 10; and x is an integer equal to 1, 2 or 3.

2. The coating composition of claim 1, wherein the polymer comprises at least two hydroxyl and/or amine groups.

3. The coating composition of claim 1, wherein the silicon hydride comprises a polysiloxane containing silicon hydride.

4. The coating composition of claim 3, wherein the polysiloxane containing silicon hydride has the general formula:

$$R-\underset{R}{\overset{R}{Si}}-O-[\underset{R}{\overset{R}{Si}}-O]_n-[\underset{H}{\overset{R}{Si}}-O]_m-\underset{R}{\overset{R}{Si}}-R \text{ or}$$

$$H-\underset{R}{\overset{R}{Si}}-O-[\underset{R}{\overset{R}{Si}}-O]_n-[\underset{H}{\overset{R}{Si}}-O]_{m'}-\underset{R}{\overset{R}{Si}}-H,$$

wherein each substituent group R, which may be identical or different, represents OH or a monovalent hydrocarbon group connected to the silicon atom; n is 0 to 50, m is at least 1; and m' is 0 to 50, such that the ratio of hydrogen-bonded silicon atoms to non-hydrogen-bonded silicon atoms is from 0.1:1 to 10:1.

5. The coating composition of claim 4, wherein n is 2 to 15.

6. The coating composition of claim 3, wherein the polysiloxane containing silicon hydride has the general formula:

$$R-\underset{R}{\overset{R}{Si}}-O-[\underset{R}{\overset{R}{Si}}-O]_{n'}-\underset{R}{\overset{R}{Si}}-R$$

wherein each substituent group R, which may be identical or different, represents a group selected from H, OH, a monovalent hydrocarbon group, and mixtures of any of the foregoing; at least one of the groups represented by R is H, and n' ranges from 0 to 100, such that the percent of Si—H content of the polysiloxane ranges from 2 to 50 percent.

7. The coating composition of claim 6, wherein n is 4 to 5.

8. The coating composition of claim 1, wherein the unsaturated polycarboxylic acid anhydride comprises a cycloaliphatic unsaturated dicarboxylic acid anhydride.

9. The coating composition of claim 8, wherein the cycloaliphatic unsaturated dicarboxylic acid anhydride is of the general formula:

wherein Z is selected from —O— and C—(R)$_2$ and R, $R^1$, $R^2$, $R^3$, $R^4$, and $R^5$ are each independently selected from hydrogen, a halogen, a $C_{(1-13)}$ monovalent hydrocarbon radical, and a substituted $C_{(1-13)}$ monovalent hydrocarbon radical.

10. The coating composition of claim 9, wherein Z is C—(R)$_2$.

11. The coating composition of claim 10, wherein the cycloaliphatic unsaturated dicarboxylic acid anhydride comprises norbornene dicarboxylic acid anhydride.

12. The coating composition of claim 1, wherein x is 3, v is 3, and $R^1$ is methyl.

13. The coating composition of claim 1, wherein the composition is substantially free of radiation curable compounds.

14. The coating composition of claim 1, wherein the crosslinking agent consists essentially of the ungelled hydrosilylation reaction product of a silicon hydride and an unsaturated polycarboxylic acid anhydride.

15. The coating composition of claim 1, wherein the composition is sprayable and has a VOC content of no more than 4 pounds of VOC per gallon of the composition.

16. A method of using a coating composition, comprising:
   (a) applying the composition to a substrate;
   (b) allowing the composition to coalesce to form a substantially continuous film on the substrate, and
   (c) allowing the composition to cure at a temperature of no more than 60° C., wherein the coating composition comprises:
      (i) a polymer comprising functional groups reactive with anhydride groups; and a crosslinking agent comprising an ungelled hydrosilylation reaction product of a polysiloxane containing silicon hydride and an unsaturated cycloaliphatic polycarboxylic acid anhydride.

17. A low-temperature thermosettable coating composition comprising:
(a) a polymer comprising functional groups reactive with anhydride groups; and
(b) a crosslinking agent comprising the ungelled hydrosilylation reaction product of a polysiloxane containing silicon hydride and a cycloaliphatic unsaturated dicarboxylic acid anhydride of the general formula:

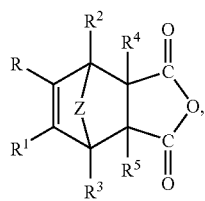

wherein Z is selected from —O— and C—(R)$_2$ and R, R$^1$, R$^2$, R$^3$, R$^4$, and R$^5$ are each independently selected from hydrogen, a halogen, a C$_{(1-13)}$ monovalent hydrocarbon radical, and a substituted C$_{(1-13)}$ monovalent hydrocarbon radical; and
(c) a hydrolyzable group containing compound comprising a reaction product of a polyisocyanate and a secondary amine-containing alkoxysilane represented by the general formula:

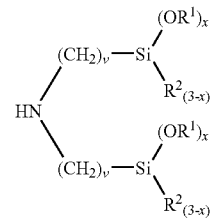

wherein each R$^1$ and R$^2$, which may be identical or different, represents an alkyl group containing from 1 to 10 carbons or a phenyl group; each v, which may be the same or different, is an integer of from 1 to 10; and x is an integer equal to 1, 2 or 3.

* * * * *